(12) United States Patent
Kirscht et al.

(10) Patent No.: US 8,055,813 B2
(45) Date of Patent: Nov. 8, 2011

(54) FLEXIBLE AND EFFICIENT CONFIGURATION OF MULTIPLE COMMON INTERFACES

(75) Inventors: Joseph A. Kirscht, Rochester, MN (US); Elizabeth A. McGlone, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 826 days.

(21) Appl. No.: 12/132,711

(22) Filed: Jun. 4, 2008

(65) Prior Publication Data

US 2009/0307443 A1 Dec. 10, 2009

(51) Int. Cl.
*G06F 13/00* (2006.01)
*G06F 15/177* (2006.01)
(52) U.S. Cl. .......................................... 710/33; 709/220
(58) Field of Classification Search ...................... 710/33
See application file for complete search history.

(56) References Cited

U.S. PATENT DOCUMENTS

| | | | | |
|---|---|---|---|---|
| 5,867,501 | A | * | 2/1999 | Horst et al. .................... 370/474 |
| 5,872,783 | A | * | 2/1999 | Chin ......................... 370/395.32 |
| 7,174,371 | B2 | * | 2/2007 | Elo et al. ....................... 709/220 |
| 2002/0110086 | A1 | * | 8/2002 | Reches .......................... 370/235 |

* cited by examiner

*Primary Examiner* — Henry Tsai
*Assistant Examiner* — Juanito Borromeo
(74) *Attorney, Agent, or Firm* — Bockhop & Associates, LLC

(57) ABSTRACT

In a system for communicating data from a processor to a plurality of register groupings that includes a plurality of registers and a plurality of register decoding logic entities, each register is associated with one of the plurality of register groupings. The plurality of register decoding logic entities is arranged in a data communication ring and is assigned to a register grouping. Each register decoding logic entity is configured to: receive a data packet that includes a data unit intended for a set of the registers in communication with the register decoding logic entity; write the data unit to each of the set of registers; determine if the register decoding logic entity is set to a relay mode; and if the register decoding logic entity is set to the relay mode, then update the data packet to reflect an address corresponding to a next register decoding logic entity in the data communication ring and then transmit the data packet to the next register decoding logic entity for which the data packet is intended.

20 Claims, 2 Drawing Sheets

FLEXIBLE AND EFFICIENT CONFIGURATION OF MULTIPLE COMMON INTERFACES

BACKGROUND OF THE INVENTION

1. Field of the Invention

The present invention relates to digital processing systems and, more specifically, to a system for configuring ports in a digital processing system.

2. Description of the Prior Art

Frequently, integrated circuits will employ several copies of the same logic that are physically separated by relatively large distances. For example, different partitions of an input/output module can be on opposite sides of an integrated circuit chip. Often, all of the partitions must initially be configured with a common set of data. Configuring such partitions can introduce complexity to the chip.

Several different approaches are used to configure different partitions on a chip with common initial data. One approach is to use a single set of registers and distribute the data from the set of registers to each partition. This approach has the disadvantage of requiring repowering of each data line and an increased wiring complexity in the chip. Another approach requires creating a plurality of copies of the registers and hard wiring each copy to a common set of data inputs. This approach is inflexible, in that the registers cannot receive data independently, and it results in increased wiring complexity. Yet another approach is to place all of the registers on a common data bus and assign common addresses to groupings of registers. This approach, while reducing the wiring problem, is also inflexible. With these solutions, the effect of the initial program load time can be compounded if the registers being targeted on one interface are used as interface registers to perform reads and writes to multiple other chips.

Therefore, there is a need for a system for writing common data units to a plurality of different registers without increasing on-chip wiring and while maintaining flexibility regarding use of the registers.

SUMMARY OF THE INVENTION

The disadvantages of the prior art are overcome by the present invention which, in one aspect, is a digital circuit for communicating data from a processor to a plurality of register groupings that includes a plurality of registers and a plurality of register decoding logic entities. Each register in the plurality of registers is associated with one of the plurality of register groupings. The plurality of register decoding logic entities is arranged in a data communication ring and is assigned to a register grouping of the plurality of register groupings. Each of the register decoding logic entities is in data communication with each of the registers associated with the register grouping to which the register decoding logic entity is assigned. The plurality of register decoding logic entities includes a first decoding logic entity in communication with the processor. Each of the plurality of register decoding logic entities is in data communication with two other of the plurality of register decoding logic entities. Each register decoding logic entity is configured to: receive a data packet that includes a data unit intended for a set of the registers in communication with the register decoding logic entity; write the data unit to each of the set of registers; determine if the register decoding logic entity is set to a relay mode; and if the register decoding logic entity is set to the relay mode, then update the data packet to reflect an address corresponding to a subsequent register decoding logic entity in the data communication ring and then transmit the data packet to the next register decoding logic entity.

In another aspect, the invention is a method of assigning data to a plurality of registers that are part of a ring, wherein each of the plurality of registers is assigned to one of a register groupings and wherein a plurality of register decoding logic entities are arranged in a data communication ring and each of the plurality of register decoding logic entities is assigned to a register grouping of the register groupings and is in data communication with all registers of the plurality of registers assigned to the register grouping of the register groupings to which the register decoding logic entity is assigned. The plurality of register decoding logic entities includes a first register decoding logic entity in communication with the processor, each of the plurality of register decoding logic entities being in data communication with two other of the plurality of register decoding logic entities. A data packet that includes a data unit intended for each of the registers in which the register decoding logic entity is in data communication is received. The data unit is written to each of the registers in which the register decoding logic entity is in data communication. If the register decoding logic entity is set to the relay mode, then the data packet is updated to reflect an address corresponding to a next register decoding logic entity in the data communication ring and is then transmitted to the next register decoding logic entity.

In yet another aspect, the invention is a method of configuring a plurality of registers, wherein each of the registers is assigned to one of a plurality of register groupings and in which a register decoding logic entity is assigned to each of the register groupings. Each of the register decoding logic entities is arranged in a data communication ring and each of the plurality of registers is in data communication with a register decoding logic entity assigned to the register grouping to which the register is assigned. A data packet is transmitted to each register decoding logic entity in the ring. If the data packet designates a selected register decoding logic entity, then a data unit from the data packet is written to each register in data communication with the selected register decoding logic entity. If the selected register decoding logic entity is set to a relay mode, then the data packet is modified to designate a next register decoding logic entity in the data communication ring. The data packet is transmitted to the next register decoding logic entity in the data communication ring.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
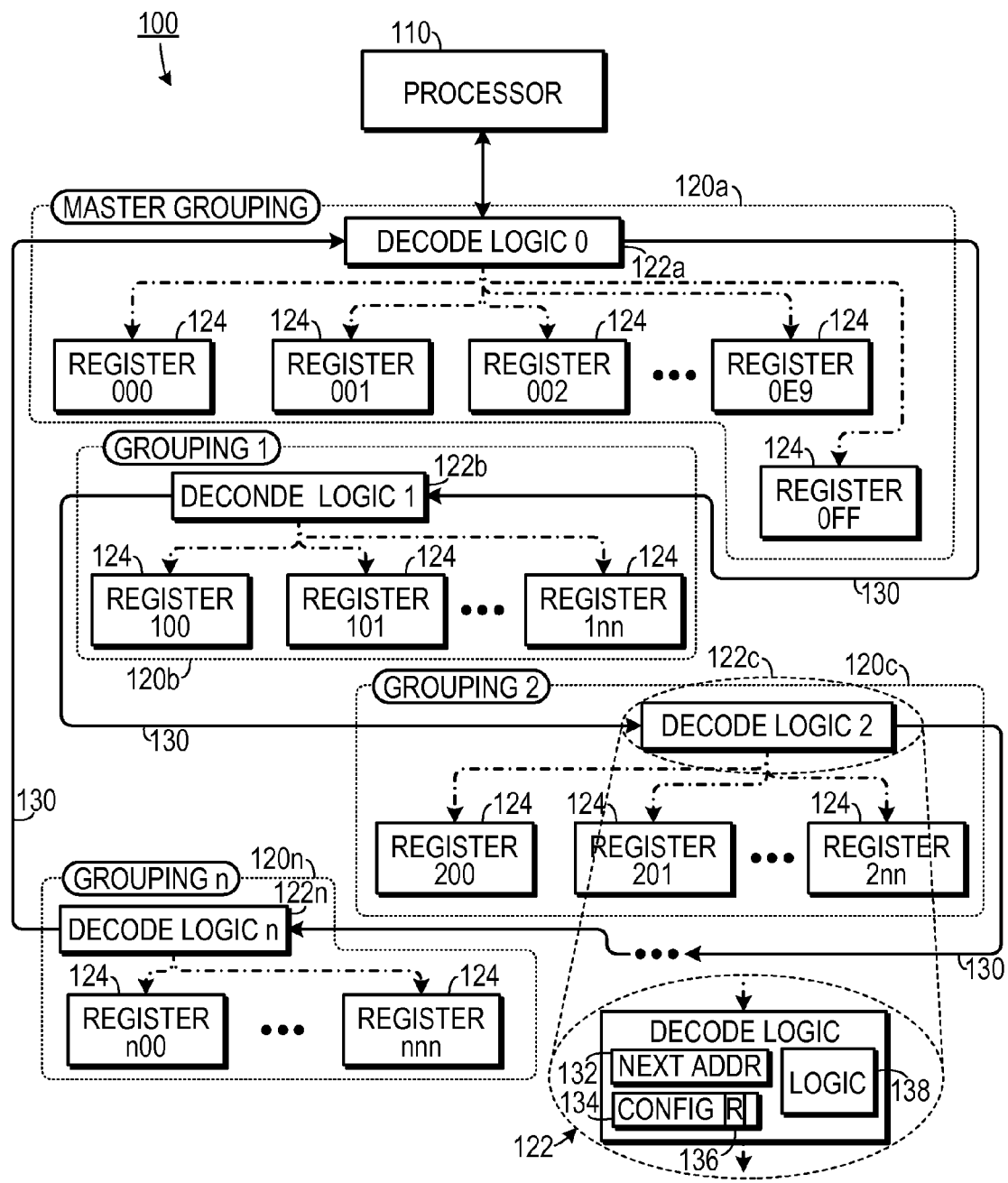
FIG. 1 is a schematic diagram of one embodiment of a data communication ring.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

One representative embodiment of a digital circuit 100 for communicating data from a processor 110 to a plurality of register groupings 120a-n (which could include the registers of a port in an input/output system) is shown in FIG. 1. Each of the plurality of register groupings 120a-n includes at least one register 124 and register decoding logic entity 122a-n. The register decoding logic entities 122a-n are arranged in a data communication ring 130 and each is in communication with each of the registers 124 in its associated register grouping 120a-n.

A first decoding logic entity 122a is in communication with the processor 110 and communicates data packets received from the processor 110 along the data communication ring 130. Each of the register decoding logic entities 122a-n is configured to: receive a data packet that includes a data unit intended for a set of the registers 124 in communication with the register decoding logic entity 122a-n; write the data unit to each of the set of registers 124 with which it is in communication; determine if the register decoding logic entity 122a-n is in a relay mode; and if the register decoding logic entity 122a-n is set to the relay mode, then update the data packet to reflect the address corresponding to a next register decoding logic entity in the data communication ring and then transmit the data packet to the next register decoding logic entity 122a-n.

For example, if a data packet from the processor 110 is to be written to only a single grouping of the registers, such as Grouping 1 120b, then the system will set all of the decoding logic entities 122a-n to a "non-relay" mode and the data packet will be addressed for decoding logic entity 122b. The data packet will be transferred from the processor 110 to decoding logic entity 122a, which will transfer it to decoding logic entity 122b.

If, on the other hand, the data packet is to be written to each of the register groupings 120a-n, then the system will set all of the decoding logic entities 122a-n to a "relay" mode. The processor will address the data packet for decoding logic entity 122a and transmit it to decoding logic entity 122a, which will write data units in the data packet to the intended registers 124 in register grouping 120a. Decoding logic entity 122a will then change the address in the data packet to indicate that it is intended for decoding logic entity 122b and then transmit it to decoding logic entity 122b. Decoding logic entity 122b will write the data to the registers 124 in its associated grouping 120b and then readdress the data packet for decoding logic entity 122c. This process will continue until the data packet has been transferred to the final decoding logic entity 122n in the data ring 130. The final decoding logic entity 122n will restore the data packet to its original format and transfer it to the first decoding logic entity 122a, thereby indicating that the data packet has been transferred to each of the first decoding logic entities 122a-n in the ring. Upon receipt of the data packet, the first decoding logic entity 122a performs a checking operation to ensure the complete routing of the data packet.

In another example, the system could set only select decoding logic entities to relay mode. For example, only decoding logic entities 122a and 122c could be configured to relay mode. In such a case a data packet could be sent from the processor 110 to decoding logic entity 122a, which writes it to associated registers 124, addresses the data packet for the subsequent decoding logic entity (which in this case is decoding logic entity 122c) and then transmits the data packet to the next decoding logic entity 122b on the data communication ring 130. Decoding logic entity 122b simply passes the data packet on to decoding logic entity 122c, which writes it to its associated registers 124 and passes it on to the next decoding logic entity in the data communication ring 130.

Each of the register decoding logic entities 122a-n would include several registers; including a next address register 132, a configuration register 134, that includes a relay mode flag 136 and internal logic 138. Initially, the system's basic input/output system (BIOS) sets the relay mode flag 136 of each of the register decoding logic entities 122a-n for which the data packet is intended to the relay mode and transmits to each of the register decoding logic entities 122a-n an address for the next register decoding logic entity 122a-n to which the data packet is to be forwarded when in the relay mode. In one example of a system initialization, BIOS will setup for "relay mode" one time and then performs all of the operations for which common configuration values target all of the different common instances of logic. BIOS then resets back to non-relay mode one time and then performs all of the operations that require unique configuration values within the different common instances of logic on the chip.

Figure 2:
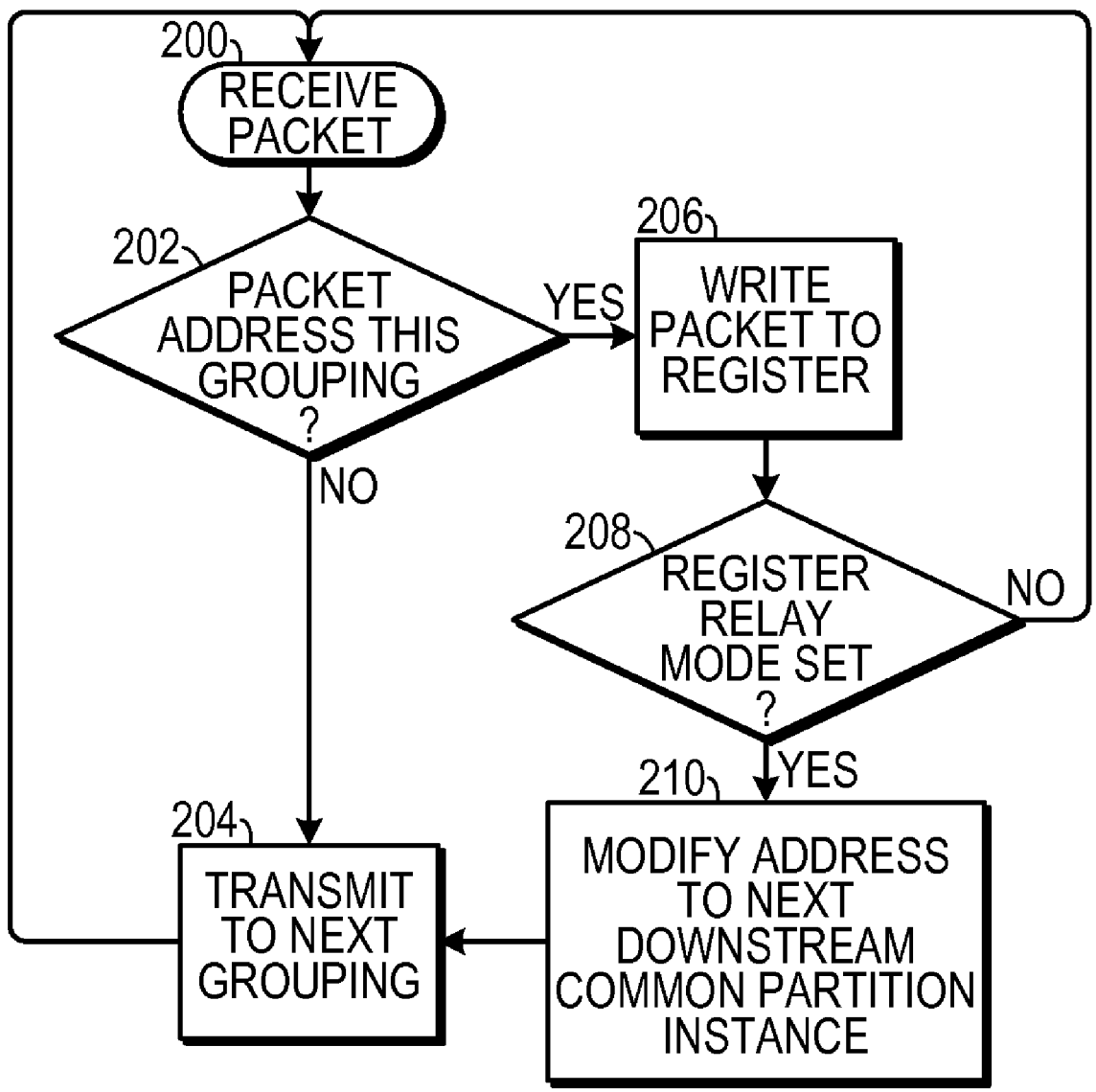
FIG. 2 is a flow chart demonstrating a method of configuring a data packet for transmittal in the ring.

As shown in FIG. 2, a decoding logic entity receives a data packet 200 and determines 202 if the data packet is intended for its associated grouping. If not, it forwards the data packet 204 to the next decoding logic entity in the data ring. If the data packet is intended for the decoding logic entity, it writes 206 data from the packet to its associated registers. The decoding logic entity then determines if it is set to the relay mode 208 and, if not, it waits to receive the next data packet 200. Otherwise, it modifies the data packet 210 to include the address of the next decoding logic entity for which the data packet is intended in the data ring and transmits 204 the data packet to the next decoding logic entity in the data ring.

This system allows configuration of information that needs to be set in multiple logic instances through a single BIOS command. It preserves flexibility in the data ring and does not impact the amount or routing of wiring in the system. In the case of one system, each memory port connects externally to multiple memory port chips that need to have their registers configured via an interface register within the memory port registers. All common configuration information within a chip can also be transmitted in parallel with single a BIOS operation. In addition, if a chip is connected to memory chips that need to have their mode registers configured, such configuration can also be done in parallel. This results in reduced overhead for BIOS code and improved initial program load time. This approach also works when any combination of ports are configured, allowing each port to forward the data packet to the next downstream port that has memory configured, skipping those that have no configured memory, by simply altering the next address in the register decoding logic entities 122a-n.

In addition to containing multiple instances of a common partition, the ring may contain other partitions as well, the ordering of which is dictated by relative physical positioning on the chip.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A digital circuit for communicating data from a processor to a plurality of register groupings, comprising:
   a. a plurality of registers in which each register is associated with one of the plurality of register groupings;
   b. a plurality of register decoding logic entities arranged in a data communication ring and each of the plurality of register decoding logic entities assigned to a register grouping of the plurality of register groupings, each of the register decoding logic entities in data communication with each of the registers associated with the register grouping to which the register decoding logic entity is assigned, the plurality of register decoding logic entities including a first decoding logic entity in communication with the processor, each of the plurality of register decoding logic entities in data communication with two other of the plurality of register decoding logic entities, each register decoding logic entity being configured to:
      i. receive a data packet that includes a data unit intended for a set of the registers in communication with the register decoding logic entity;
      ii. write the data unit to each of the set of registers;
      iii. determine if the register decoding logic entity is set to a relay mode; and
      iv. if the register decoding logic entity is set to the relay mode, then update the data packet to reflect an address corresponding to a subsequent register decoding logic entity and then transmit the data packet to a next register decoding logic entity in the data communication ring.

2. The digital circuit of claim 1 wherein a first register decoding logic entity is configured to receive a data packet from the processor.

3. The digital circuit of claim 1, wherein a last one of the plurality of register decoding logic entities in the data communication ring that is in data communication with the first register decoding logic entity is configured to restore the data packet to an original format and then transmit the data packet to the first register decoding logic entity.

4. The digital circuit of claim 3, wherein the first register decoding logic entity is configured to perform a checking operation on a data packet received from the last one of the plurality of register decoding logic entities, thereby ensuring complete routing of the data packet.

5. The digital circuit of claim 1, wherein at least one of the register groupings is associated with a port in a computer system.

6. The digital circuit of claim 1, wherein a basic input/output system (BIOS) is configured to set each of the register decoding logic entities for which the data packet is intended to the relay mode.

7. The digital circuit of claim 6, wherein the basic input/output system (BIOS) is further configured to transmit to each of the register decoding logic entities an address for the next register decoding logic entity to which the data packet is to be forwarded when in the relay mode.

8. The digital circuit of claim 6, wherein the basic input/output system (BIOS) is further configured to reset each of the register decoding logic entities to a non-relay mode once all registers in multiple partitions that require common values have been configured.

9. A method of assigning data to a plurality of registers that are part of a ring, wherein each of the plurality of registers is assigned to one of a register groupings and wherein a plurality of register decoding logic entities are arranged in a data communication ring and each of the plurality of register decoding logic entities is assigned to a register grouping of the register groupings and is in data communication with all registers of the plurality of registers assigned to the register grouping of the register groupings to which the register decoding logic entity is assigned, the plurality of register decoding logic entities including a first register decoding logic entity in communication with the processor, each of the plurality of register decoding logic entities being in data communication with two other of the plurality of register decoding logic entities, the method comprising the actions of:
   a. receiving a data packet that includes a data unit intended for each of the registers in which the register decoding logic entity is in data communication;
   b. writing the data unit to each of the registers in which the register decoding logic entity is in data communication; and
   c. if the register decoding logic entity is set to the relay mode, then updating the data packet to reflect an address corresponding to a subsequent register decoding logic entity and then transmitting the data packet to a next register decoding logic entity on the ring.

10. The method of claim 9, wherein the first register decoding logic entity is configured to perform the actions of:
    a. receiving a data packet from the processor; and
    b. forwarding the data packet to a next register decoding logic entity in the data communications ring.

11. The method of claim 9, wherein a last one of the plurality of register decoding logic entities in the data communication ring that is in data communication with the first register decoding logic entity is configured to perform the action of restoring the data packet to an original format and then transmitting the data packet to the first register decoding logic entity.

12. The method of claim 11, wherein the first register decoding logic entity is configured to perform the action of executing a checking operation on a data packet received from the last one of the plurality of register decoding logic entities, thereby ensuring complete routing of the data packet.

13. The method of claim 9, wherein at least one of the register groupings is associated with a port in a computer system.

14. The method of claim 9, further comprising the action of setting each of the register decoding logic entities for which the data packet is intended to the relay mode.

15. The method of claim 14, further comprising the action of transmitting to each of the register decoding logic entities an address for the next register decoding logic entity to which the data packet is to be forwarded when in the relay mode.

16. The method of claim 14, further comprising the action of resetting each of the register decoding logic entities to a non-relay mode once the data packet has been sent to each of the register decoding logic entities.

17. A method of configuring a plurality of registers, wherein each of the registers is assigned to one of a plurality of register groupings, a register decoding logic entity is assigned to each of the register groupings and each of the register decoding logic entities is arranged in a data communication ring, each of the plurality of registers being in data communication with a register decoding logic entity assigned to the register grouping to which the register is assigned, the method comprising the actions of:
   a. transmitting a data packet to each register decoding logic entity in the ring;
   b. if the data packet designates a selected register decoding logic entity, then writing a data unit from the data packet to each register in data communication with the selected register decoding logic entity;

c. if the selected register decoding logic entity is set to a relay mode, then modifying the data packet to designate a subsequent register decoding logic entity in the data communication ring; and
d. transmitting the data packet to a next register decoding logic entity in the data communication ring.

18. The method of claim 17, further comprising the actions of:
a. receiving the data packet in an original format from a processor by a first register decoding logic entity in the ring; and
b. transmitting the data packet from the first register decoding logic entity to an adjacent register decoding logic entity in the ring.

19. The method of claim 18, further comprising the actions of:
a. receiving the data packet by a last register decoding logic entity in the ring;
b. restoring the data packet to the original format; and
c. transmitting the data packet in the original format to the first register decoding logic entity in the ring.

20. The method of claim 19, further comprising the action of performing a checking operation on the data packet received from the last register decoding logic entity, thereby ensuring complete routing of the data packet.

* * * * *